Inventor:
Charles S. Walker,
by Irving H. Marshman
Attorney.

Inventor:
Charles S. Walker,
by Irving H. Marshman
Attorney.

United States Patent Office 3,196,344
Patented July 20, 1965

3,196,344
VOLTAGE REGULATOR INCLUDING A NONLINEAR MIXING NETWORK TO LIMIT THE POWER DISSIPATION OF A CONTINUOUSLY CONDUCTING SERIES REGULATING TRANSISTOR
Charles S. Walker, Moylan, Pa., assignor to General Electric Company, a corporation of New York
Filed Apr. 27, 1961, Ser. No. 105,935
4 Claims. (Cl. 323—22)

This invention relates to power supplies, more particularly to power supplies which have an unregulated input and a regulated output and it has for an object a provision of simple, reliable, improved and efficient device of this character.

More particularly, the invention relates to current supply apparatus and particularly to apparatus for controlling the supply of current to a load to minimize changes of load voltage, and a further object of the invention is the provision of an improved apparatus of this character in which a transistor is connected in series relationship between the input and the output for the purpose of regulating the output, and more particularly for maintaining the output voltage substantially constant at a predetermined value.

A major problem in the use of series regulating transistors in power supplies is the provision of adequate protection of the transistors against thermal-overload, and accordingly a more specific object of the invention is the provision of improved protection against excessive power dissipation in the series regulating transistor which is the cause of the overheating.

In carrying the invention into effect in one form thereof, means are provided for deriving electrical quantities which are representative of the voltage across the series regulating transistor and the current flowing in its emitter collector conductive path. These quantities are mixed in a non-linear network which, when the product of the transistor current and voltage begins to exceed a product value that is generally constant over a range of output current values causes a signal to be supplied to the control circuit of the regulating transistor which shifts its operating point to limit the dissipation to the safe range.

For a better and more complete understanding of the invention reference should now be had to the following specification and to the accompanying drawings of which:

Figure 1:
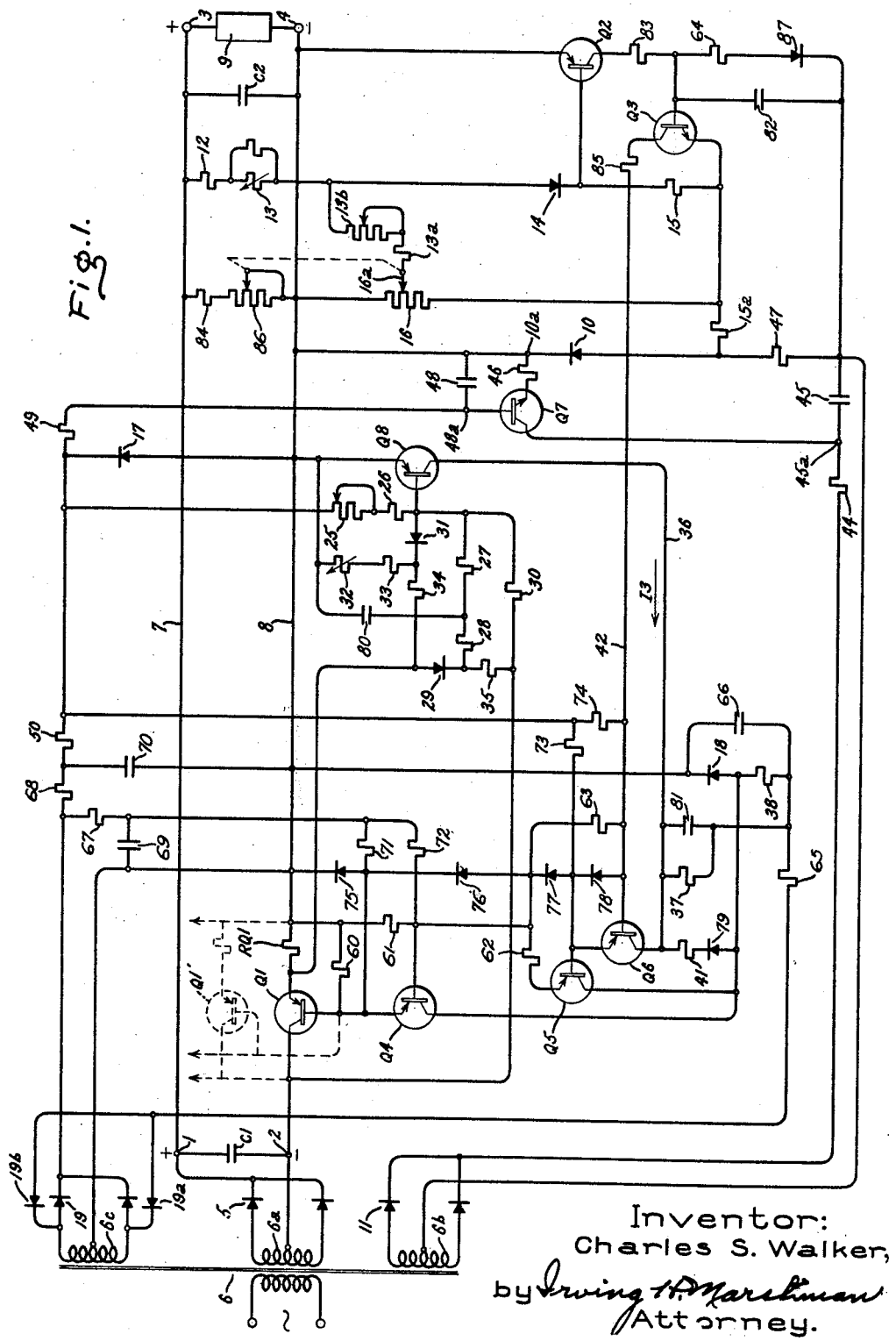
FIG. 1 is a simple schematic diagram of an embodiment of the invention.

Referring now to the drawing, and particularly to FIG. 1 thereof, a power supply is illustrated as having an input at positive and negative input terminals 1 and 2 respectively and an output at positive and negative ouptut terminals 3 and 4. Unregulated direct voltage is supplied to the input from a suitable source such for example as the full wave diametric rectifier 5 which is supplied from a suitable source of alternating voltage such as the secondary winding 6a of the transformer 6. Regulated direct voltage is supplied from the output terminals 3 and 4 to a load 9 which is conventionally illustrated since it may be any suitable load such, for example, as the electronic system of a computer, aircraft or missile. Electrical connections 7 and 8 are provided between the input and output terminals, and direct current is supplied from the output terminals to the load 9. For the purpose of regulating the output voltage so as to maintain it substantially constant at a preset value throughout a wide range of values of load current, a regulating power transistor Q1 is provided. It is illustrated as a PNP transistor and as shown its controlled conducting path, i.e., its collector emitter path is included in series relationship in the connection 8. The current demand of the load may require one or more similar transistors connected in parallel with transistor Q1 as indicated by the transistor Q1' illustrated in dashed lines in FIG. 1. The current in the collector emitter conducting path is controlled by means of a control circuit in which its base is included. Included in series relationship in the negative line between the emitter of transistor Q1 and the negative output terminal 4 is a voltage dropping device which is illustrated as a resistor RQ1. The transistor Q1 may be of any suitable type. Assuming the supply to have a rated maximum output voltage of 30 volts and a maximum rated load current of 10 amperes this transistor might appropriately be a plurality of 2N511B transistors connected in parallel.

For the purpose of controlling the regulating transistor to maintain the output voltage substantially constant, a regulating amplifier is provided. This is illustrated as a multistage transistor amplifier connected between the power supply output and the base of regulating transistor Q1 to complete a negative feedback regulating loop. This amplifier is illustrated as comprising transistors Q1, Q2, Q3, Q4, Q5 and Q6 of which transistors Q2 and Q3 constitute a preamplifier and transistors Q1, Q4, Q5 and Q6 constitute the main amplifier.

The emitter collector path of the preamplifier first stage transistor Q2 is connected across a suitable source of constant voltage such as the Zener diode 10 which is connected in series with a resistor 47 to constitute a voltage divider. This divider is supplied from a suitable source of direct voltage such, for example, as the full wave rectifier 11 which in turn is supplied from a suitable source of alternating voltage such as the transformer secondary winding 6b.

A connection is made from output terminal 3 through linear resistor 12, a temperature-senstive resistor 13 having a negative temperature coefficient and diode 14 to the base of first stage transistor Q2. This connection furnishes current in such a direction as to reduce the collector current of transistor Q2. Forward conduction of diode 14 is assured by means of resistors 15 and 15a connected in series between the diode and the negative terminal of the Zener diode 10.

A voltage divider comprising the resistor 15a and a potentiometer 16 is connected across the Zener diode 10. The slider 16a of the potentiometer is generally at a potential that is more negative than output terminal 4 to which the emitter of first stage transistor is directly connected. Therefore current tends to flow from terminal 4 through emitter and base of transistor Q2, through diode 14 and through resistor 13b and 13a to the slider potentiometer 16 thereby tending to turn on transistor Q2. The net current flowing through the diode 14 is thereby reduced. The net effect of these turn on and turn off currents is to cause transistor Q2 to be conducting in its linear range as an amplifier when the output voltage at terminals 3 and 4 is at its normal predetermined value.

The collector emitter path of second stage transistor Q3 is connected across the constant voltage terminals of the Zener diode 10 through the cascaded emitters and bases of the regulating transistor Q1, and the transistors Q4, Q5 and Q6 of the main amplifier. As shown, the base of each of transistors Q1, Q4 and Q5 is connected to the emitter of the next transistor in the order named and the base of transistor Q6 is connected to the collector of transistor Q3. Feedback and current limiting resistors are of course included in this circuit as shown.

Two Zener diodes 17 and 18 are serially connected across a suitable source of direct voltage supply such as the full wave diametric rectifier 19 which is supplied from a suitable source of alternating voltage such as the secondary windings 6c of transformer 6. Actually the diode 17 is connected between the positive terminal of rectifier 19 and the midtap of secondary winding 6c and the diode 18 is included in a connection that extends from the midtap to conductor 8, diode 18, resistor 33 and through rectifier 19a or 19b to whichever of the transformer secondary terminals is negative at any particular instant. Both Zener diodes 17 and 18 are connected to conductor 8 which is connected to output terminal 4. The collectors of transistors Q4, Q5 and Q6 are connected to the negative terminal of Zener diode 18 of which the positive terminal is connected to the conductor 8 and thence through voltage dropping resistor RQ1 to the emitter of transistor Q1 and from the base of each of the transistors Q1, Q4 and Q5 to the emitter of the next transistor in the cascade connection.

Briefly the operation of the control to maintain the output voltage of the supply substantially constant is as follows: Assuming, that it is desired to maintain the output voltage at an intermediate value, e.g., 15 volts, the slider of potentiometer 16 is set at a calibrated point corresponding to 15 volts. If the load resistance increases, less current flows in the load; hence the voltage across output capacitor C2 increases. This increase in voltage across capacitor C2 results in an increase in current through resistor 12 and as a result the base and collector currents of transistor Q2 are correspondingly reduced. This in turn produces a decrease in the collector current of transistor Q3 and likewise in the base emitter currents of transistors Q6, Q5, Q4 and regulating transistor Q1 and consequently in the emitter collector current of Q1. Since this latter current is the output load current, the voltage across the load is decreased to restore it approximately to the desired preset value. If the load resistance is decreased, a similar but opposite action takes place to provide the necessary correction. The control does not restore the output voltage completely to the desired preset voltage; at all times a small but finite error signal exists.

Figure 2:
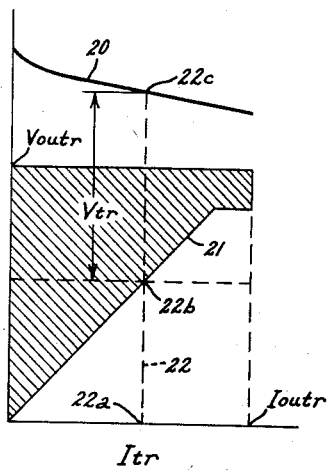
FIG. 2 is a chart of operating characteristics which facilitates an understanding of the transistor protection problem.

Present in a series regulating transistor type of power supply such as described is the problem of excessive watt dissipation in the regulating transistor. This problem will be understood by the following explanation taken in connection with FIG. 2 of the drawing. In this figure ordinates represent voltage and abscissae $I_{tr}$ represent current in the emitter collector path of the regulating transistor which current is also the output current under steady state conditions. The value of current represented by abscissa $I_{outr}$ is the rated output current of the supply and hence the rated current of the regulating transistor. Similarly, the ordinate $V_{outr}$ represents the rated output voltage of the supply. The relationship between the output current of the power supply and the unregulated direct input voltage, i.e., the voltage across capacitor C1 is represented by curve 20. For any given value of output current within the rated range a vertical line through the point representing such value may be drawn. The ordinate of the point of intersection of such vertical line with the boundary 21 between the unshaded and shaded portions of FIG. 2 represents the output voltage. The difference between the intersection of such vertical line with the curve 20 and the output voltage ordinate is representative of the voltage across the series combination of regulating transistor Q1 and voltage dropping resistor RQ1. This voltage across the transistor Q1 and resistor RQ1 is represented by the arrow $V_{tr}$. For the operating point 22a of half rated load at half rated voltage the vertical line 22 through half rated current point 22a intersects the boundary line 21 of the shaded area at 22b and intersects the unregulated voltage curve 20 at point 22c. The ordinate of point 22b represents the output voltage and the difference between ordinates 22c and 22b designated $V_{tr}$ represents the voltage across the series combination of regulating transistor Q1 and the resistor RQ1.

Figure 3:
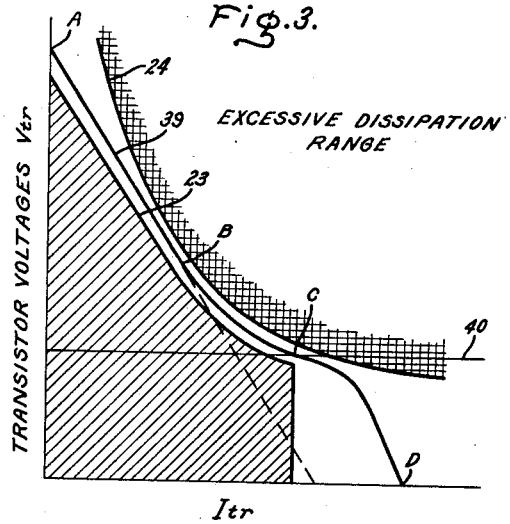
FIG. 3 is a chart of characteristic curves which facilitates an understanding of the invention.

Allowance must be made for sufficient dissipation to satisfy all operating points within the required operating range, i.e., the shaded area, and in addition the dissipation in the transistor must not be permitted to exceed a predetermined maximum value. In FIG. 3 the maximum transistor voltages $V_{tr}$ required to satisfy any operating point within the guaranteed range are plotted as a function of output current. In other words, the curve 23 of FIG. 3 is obtained by plotting the successive values of $V_{tr}$ of FIG. 2 with respect to $I_{tr}$. That constant watt hyperbola 24 which will just exclude all of the required operating points represents the maximum required watts dissipation in the regulating transistor. This minimum hyperbola determines one boundary of desired constant watt operation characteristic of the regulating transistor. The other boundary is the $V_{tr}$ v $I_{tr}$ curve 23

In the example assumed, half rated output current is 5 amperes and half rated output voltage is 15 volts and the unregulated supply voltage at 5 amperes output is 43.5 volts. Thus the transistor voltage $V_{tr}$ for this operating point is 43.5 minus 15 or 28.5 volts and this results in 142.5 watts in the series combination of transistor Q1 and resistor RQ1. As seen in FIG. 2, this is the maximum watts dissipation required for any operating point within the required range at 15 volts output. The maximum dissipation that would be required for the worst operating point within the required range would, for the example assumed be approximately 150 watts. It should be noted, however, that if the load resistance should decrease from 3 ohms to 1.5 ohms the output current would double from 5 amperes to 10 amperes. The output voltage would still be held at 15 volts by the voltage regulating loop. Owing to the decreased C1 voltage which results from the regulation of the input supply, $V_{tr}$ is now 25.5 volts. The dissipation in the series combination of transistor Q1 and resistor RQ1 would be 255 watts of which 10 would be dissipated by the resistor and 245 by the transistor.

Thus the transistor would be subjected to considerably greater dissipation than is required to supply all values of current within the guaranteed range and the dissipation would be so excessive as possibly to result in the destruction of the transistor or to require a much larger transistor or much greater number of transistors in parallel than is necessary since the supply is capable of supplying all simultaneous values of output current and voltage within the required range without exceeding 150 watts dissipation in the transistor Q1 and resistor RQ1 combination.

To prevent destruction of the transistor by excessive dissipation, a protective circuit is provided to limit the transistor dissipation while permitting operation of the power supply at any point within the guaranteed range. The watts dissipation characteristic produced by this protective circuit is shaped so that no more power is dissipated in the transistor than is required to be dissipated in producing guaranteed output range. By this means the number and size of power transistors required is minimized and the transistors themselves are protected against destruction by excessive power dissipation.

Figure 4:
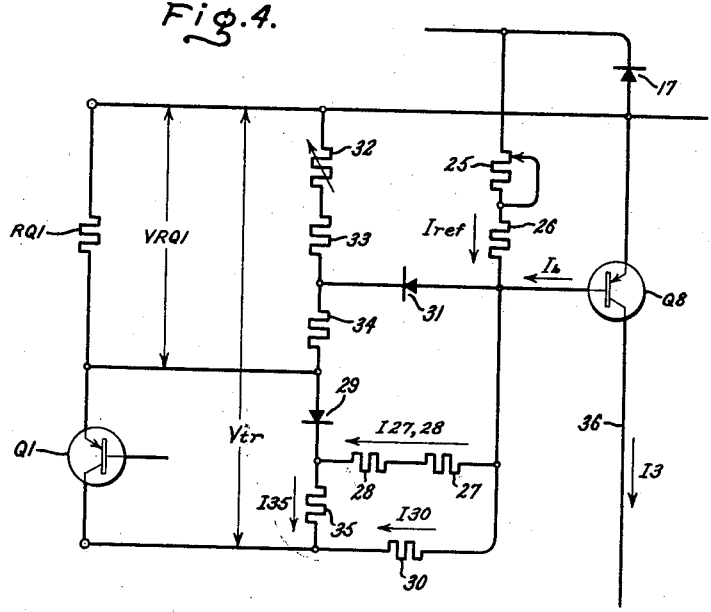
FIG. 4 is a schematic diagram of a portion of the diagram of FIG. 1 enlarged for the purpose of facilitating a clearer understanding of the structure and operation of this portion.

This protective circuit is illustrated as a nonlinear network in which signals are derived which are representative of the current in the collector emitter path of the regulating transistor and of the voltage across the series combination of the transistor and resistor RQ1. These signals are modified and, together with a reference signal current, are supplied to an adder. As shown in FIGS. 1 and 4 the reference current circuit is traced from the positive terminal of Zener diode 17 through adjustable resistor 25 and fixed resistor 26 to the base of transistor Q8 and from its emitter to the negative terminal of the Zener diode. The reference current I*ref* is a function of the Zener voltage and the resistors 25 and 26 and is supplied to the base of the transistor Q8 which operates as an adder. Also supplied to this adder is a signal representative of the current in the collector emitter circuit of the regulating transistor. This signal current flows in the resistors 27 and 28 which are included in series in a circuit that is traced from one terminal of resistor RQ1 to the emitter of transistor Q3 and from its base through resistors 27 and 28 and diode 29 to the opposite terminal of the resistor RQ1. The terminal of resistor RQ1 to which the emitter of transistor Q8 is connected is positive with respect to the other terminal and consequently as shown, the diode 29 is connected in blocking polarity with respect to the voltage across resistor RQ1. However, resistor 35 permits current to flow through diode 29 as a result of the emitter to collector voltage of transistor Q1. Thus this circuit across voltage dropping device RQ1 supplies to the adder a current signal representative of the current of the regulating transistor. A resistor 30 is connected through the base and emitter of transistor Q8 across the series combination of transistor Q1 and resistor RQ1 and thus supplies to the adder a signal current representative of the voltage V*tr* across the regulating transistor. A diode 31 is connected between the base of transistor Q8 and an intermediate point on a voltage divider comprising the series combination of resistors 32, 33 and 34 connected across resistor RQ1. The diode 31 is connected in forward conducting polarity with respect to the voltage across resistor RQ1. The diodes 29 and 31 have nonlinear resistance characteristics.

By means of a conductor 36, FIG. 1, the collector of transistor Q8 is connected to the common terminal of the collector of transistor Q6 and a resistor 37 and through this latter resistor and a resistor 38 to the negative terminal of the Zener diode 18 of which the positive terminal is connected to conductor 8 to which the emitter of transistor Q8 is also connected.

As a result of the reference current and the signal currents supplied to the adder (transistor Q8) a current I3 flows through conductor 36 to the collector of transistor Q6 of the main amplifier. By varying the resistor 25, the current I3 may be adjusted to an initial value at which the adder Q8 is just at the critical point of beginning to supply a turnoff signal to the transistor Q6 of the main amplifier when the regulating transistor Q1 is operating at maximum allowable watts dissipation. As long as current I3 is maintained constant at this critical value, zero turn-off signal will be supplied. The function of the nonlinear network is to prevent the current I3 for exceeding its initially set constant critical value for all values of dissipation of the regulating transistor Q1 within the required range for guaranteed output, i.e., within the single cross hatched area of FIG. 3 and to cause current I3 to vary and thereby supply a turnoff signal to the regulating transistor Q1 before its dissipation increases into the excessive dissipation range represented by the double cross hatched area of FIG. 3.

The locus of all the operating points at which a constant turnoff signal is supplied is appropriately a curved line 39 between the boundary line 23 and the hyperbolic constant watts curve 24. Within a predetermined zone this curve is a very close approximation of an hyperbola, but it is undesirable that it adhere to the hyperbolic configuration in the high voltage and in the high current regions since this would indicate operation at voltages higher than necessary to have available to meet operation in the guaranteed range and at currents beyond the transistor or other component current ratings.

The operation of the nonlinear network to provide an operating characteristic such as represented by the curve 39 is as follows. In the region between the points A and B, the curve 39 is fairly linear and results primarily from the effect produced by the linear resistors 27, 28 and 30. At point A, current I*tr* is zero and the voltage V*tr* across the transistor has a relatively high value; hence the current I27, 28 in resistors 27 and 28 is relatively small, I*ref* and I*b* being equal to I30. However the current I35 in resistor 35 is relatively large. Consequently, diode 29 is conducting. In the central region of curve 39, diode 29 is still conducting but the current through resistors 27 and 28 is continually increasing because voltage VRQ1 is increasing and the base to emitter voltage of transistor Q8 remains constant since current I3 is assumed constant. Since voltage V*tr* is decreasing, current I30 must be decreasing since the sum of currents I30 and I27, 28 must equal the constant sum of currents I*ref* and I*b*. In this connection the current I*ref* is the reference current and is constant and the current I*b* which is the base current of transistor Q8 is constant as long as the collector current I3 is constant. Owing to the decreasing voltage across the regulating transistor Q1 the current I35 through resistor 35 must be decreasing which means that the forward current through the diode 29 is decreasing. Because of the nonlinear characteristic of the resistance of diode 29 a corresponding nonlinear increase of the current through transistor Q1 and resistor RQ1 is required to maintain the transistor Q8 at the critical point of just being ready to supply a turnoff signal as represented by the portion of curve 39 between points B and C. At point C the rectifier 29 is blocking. The curvature between the points B and C approximates the curvature of an hyperbola. At the point C at which the rectifier 29 becomes blocking the curve 39 would extend along the horizontal line 40 except for the action of rectifier 31. For still higher values of current through the regulating transistor Q1 the voltage VRQ1 across resistor RQ1 is correspondingly increased and the voltage from the base of transistor Q8 to the junction of resistors 33 and 34 reaches the so-called "threshold" value of the nonlinear resistance diode 31. As a result, the diode begins to conduct a substantial amount of current which increases nonlinearly with further increases in current I*tr* through the regulating transistor, i.e., successive equal valued increases in voltage across diode 31 produce successive larger and larger increases in current through it which in turn produces the nonlinear portion of the curve 39 between the points C and D. The curve 39 is then the locus of all operating points at which the current I3 is equal to the preset constant critical value at which the adder transistor Q8 is just beginning to supply a turnoff signal to take over operation from the voltage regulating loop.

This takeover operation in response to the approach to excessive dissipation in the regulating transistor is as follows. Assuming that the operation is still at the 15 volt output level and that the load reistance is continually being reduced with a consequent increase in load current, a dangerously excessive wattage dissipation in the regulating transistor is being approached. The nonlinear network senses this and as the dissipation reaches a value which is represented by a point on curve 39, the current I3 increases above the preset critical value. Simultaneously, the currents in the collector emitter paths of transistors Q3 in the preamplifier and Q6 in the main amplifier are increasing owing to the voltage regulating operation to increase the current in the collector emitter path of the regulating transistor Q1. As current I3 increases, the voltage of the common terminal of resistors 37 and 41 (FIG. 1) becomes more positive. This tends to decrease the voltage across the emitter and collector of transistor Q6. As current I3 continues to increase the collector of transistor Q6 becomes more positive than the emitter and current flows from the collector to the base to reverse bias the emitter and thus to make transistor Q6 inactive. The collector base current flowing out of the base of transistor Q6 flows through conductor 42 to the collector of transistor Q3. Owing to the voltage regulating operation of the voltage regulating loop calling for more output current from transistor Q1, transistor Q3 is saturated, i.e., turned full on. With transistor Q3 turned full on the voltage at the base of transistor Q6 is now free to become even more positive in response to further increases in current I3 thereby to supply a corresponding increasing turnoff signal to transistors Q5, Q4 and Q1 and thus to adjust the operating point to a value represented by a point on the curve 39.

The voltage across the Zener diode 10 which serves as a source of a reference quantity with which to compare the output voltage of the supply is itself maintained essentially constant and ripple free by associated network components. As shown in FIG. 1 the voltage across the Zener diode 10 is derived from the alternating voltage supply by means of the midtapped secondary winding 6b and the full wave diametric rectifier 11. The output voltage of this rectifier has a large ripple content. A large percentage of this ripple content is filtered out by means of the series resistor 44 in the positive output lead of the rectifier and the parallel capacitor 45 connected between the remote terminal of the resistor and the negative terminal of the rectifier thereby to provide a roughly filtered voltage across the terminals of the capacitor. A resistor 46 is connected in series relationship with the main conducting path of transistor Q7; as shown it is connected in the emitter circuit and this series combination of transistor and resistor is connected between the positive terminal 45a of the capacitor 45 and the positive terminal 10a of the Zener diode 10. The negative terminal of the Zener diode is connected through resistor 47 to the negative terminal of capacitor 45.

A negative feedback connection is provided for the transistor Q7. This feedback connection is illustrated as comprising the series combination of resistor 46, Zener diode 17, and resistor 49 connecting the emitter to the base of transistor Q7, together with capacitor 48 connected between a point on resistor 46 and the base electrode of transistor Q7.

For the purpose of maintaining capacitor 48 charged to a substantially constant voltage, it is connected through resistor 49 to the terminals of Zener diode 17 which in turn is supplied with a full wave rectified voltage from the center tapped secondary winding 6c and full wave rectifier 19 supplied therefrom. A resistor 50 is connected in series between the positive terminal of rectifier 19 and the positive terminal of Zener diode 17. As a result, a moderately filtered reasonably constant voltage is supplied to capacitor 48 at a relatively low power level. In this connection the power requirements of the load supplied from Zener diode 17 might appropriately be of the order of 1 to 8 in comparison with the power requirements of the load supplied by Zener diode 10. This constant voltage serves as a reference or bias with which to compare the voltage drop across the resistor 46.

The operation is as follows: Sufficient current is supplied from rectifier 19 through resistor 50 to Zener diode 17 to maintain its operation in the avalanche region of its characteristic and as a result a fairly ripple free voltage is supplied to capacitor 48. For example the ripple could be of the order of 25 millivolts.

The ripple content in the voltage across capacitor 45 appears across the series combination of transistor Q7, resistor 46 and Zener diode 10. The dynamic resistance of the transistor Q7 as connected in combination with resistor 46 and capacitor 48 is relatively high. On the other hand the "dynamic resistance" of the Zener diode 10, i.e., the slope of its voltage v. current characteristic in the avalanche region of its characteristic is relatively low. In other words the Zener diode presents to an alternating voltage a relatively low resistance of the order of 20 ohms maximum. The series combination of transistor Q7, resistor 46 and Zener diode 10 acts as a voltage divider and since the resistance of the transistor as measured between the collector of transistor Q7 and terminal 10a is many times that of the dynamic resistance of the Zener diode, nearly all of the ripple voltage appears across the transistor and resistor 46 and only a relatively small portion appears across the Zener diode.

The voltage across capacitor 48 is positive at its terminal 48a which is connected to the base electrode of transistor Q7 and thus it acts in the turn on direction. Current flowing in the collector-emitter path produces a voltage drop across the resistor 46 that is positive at the terminal connected to the emitter and negative at the terminal connected to the capacitor. Thus this voltage drop acts in the turn off direction and the difference of these two voltages is supplied between the emitter and base of the transistor.

An increase in the current flowing through resistor 46 to the Zener diode 10 thus acts in the turn off direction. Hence transistor Q7, resistor 46, Zener diode 17, resistor 49 and capacitor 48 form a closed loop constant current regulator and any attempt of the current to change in value is impeded by the negative feedback on the base.

If the current supplied to the load connected to Zener diode 10 is constant, then the Zener current is constant since the load and the Zener are supplied from a constant current source and the voltage across the Zener will be constant. As a result of this the ripple that appears across Zener 10 is reduced to a very low value. Since loop gain of the constant current regulating loop is finite, the ripple is not entirely eliminated but is reduced to an insignificant value, e.g., of the order of .25 millivolt. For the purpose of minimizing variations in the gain in the several stages, feedback resistors are provided in appropriate locations. Resistor 60 is connected in a feedback circuit of transistor Q1 and resistor 61 is included in a feedback circuit of transistors Q1 and Q4. Similarly resistors 62 and 63 are connected in a feedback circuit for transistors Q5 and Q6, and resistors 15a and 64 are connected in a feedback circuit for transistor Q3.

Resistor 65 and capacitor 66 filter the rectifier voltage supplied to the Zener diode 18 from rectifier 19. Resistors 67 and 68 and capacitors 69 and 70 constitute a main filter network for the rectified output of rectifier 19.

Between this filter network and the bases of transistors Q1, Q4, Q5 and Q6 are connected resistors 71, 72, 73 and 74 respectively. These resistors reverse bias the base to emitter junctions of these transistors and thereby produce desired amounts of collector leakage current.

Each of diodes 75, 76, 77 and 78 is included in a connection across the emitter and base of a corresponding one of transistors Q1, Q4, Q5 and Q6 respectively. These diodes are connected in series to the negative bus 8 and serve to maintain the bases of the corresponding transistors at desired potentials with respect to bus 8.

Diode 79 when reverse biased by current I3 from the constant watts network presents increased impedance to the current. The constant watts network is protected against line transients by transient suppressor capacitor 80. Capacitors 81 and 82 are stabilizing capacitors.

Resistors 83, 84 and 85 serve to limit the currents to safe values in the circuits in which they are connected and resistor 86 is an adjustable bleeder resistor. Diode 87 provides temperature compensation.

Although the invention has been describe largely with reference to a specific embodiment, it will readily be appreciated that this embodiment is in part only illustrative and that the invention may be embodied may be embodied equally well in other forms.

What I claim as new and desire to secure by Letters Patent of the United States is:

1. A regulated power supply having an input for receiving an unregulated voltage and an output for delivering regulated voltage, electrical connections from said input to said output, a regulating transistor having base, collector and emitter electrodes, a controlled conducting path comprising two of said electrodes includes in series in said connections and a control circuit including the third of said electrodes, output voltage regulating means responsive to variations of the output voltage from a predetermined value for supplying a control current to said control circuit to maintain said output voltage substantially constant, and means for limiting power dissipation in said transistor to a critical value having a generally linear characteristic in the relatively low value region of transistor current and a generally constant watt characteristic in the adjacent relatively higher value region thereof, said power dissipation limiting means comprising means for deriving electrical quantities representative of current in said conducting path and the voltage across said transistor, takeover means for modifying said control current and a non-linear mixing network having a response characteristic that is generally linear in the low value region of transistor current and generally constant watts in the adjacent relatively higher value region, said network being connected to said deriving means and responsive to dissipation in excess of said critical value to render said takeover means active to modulate said control current in the turnoff sense to reduce said dissipation only to said critical value while permitting continuous conduction in said conducting path.

2. A regulated power supply having an input for receiving an unregulated voltage and an output, electrical connections from said input to said output, a regulating transistor having base, collector and emitter electrodes, a controlled conducting path comprising a first and a second of said electrodes included in series in said connections and a control circuit including the third of said electrodes, output voltage regulating means responsive to variations of the output voltage from a predetermined value for supplying a variable control current to said control circuit to maintain said voltage substantially constant at said predetermined value, and means for limiting the power dissipation in said transistor to a critical value comprising means for deriving representative electrical quantities from the voltage across said transistor and the current in said conducting path, a takeover means for modulating the current in said control circuit, and a non linear mixing network connected to said deriving means and to said takeover means, said network having a response characteristic that is generally linear in the low current region of said transistor current, generally constant watts in the intermediate region thereof and current limiting in the relatively higher current region thereof, said network being responsive to power dissipation in said transistor in excess of said critical value for causing said takeover means to modulate said control current to reduce said dissipation only to said critical value while permitting continuous conduction in said conducting path.

3. A regulated power supply having an input for receiving an unregulated voltage and having an output, electrical connections from said input to said output, a regulating transistor having base, collector and emitter electrodes, a controlled conducting path comprising two of said electrodes included in series in said connections and a control circuit including the third of said electrodes, a voltage dropping device connected in series in said conducting path, and means for limiting power dissipation in said transistor to a critical value comprising means for deriving from the current in said conducting path and the voltage across said two electrodes electrical quantities representative of said current and said voltage, takeover means for modulating the current in said control circuit and a non linear mixing network having a response characteristic that is generally linear in the low value region of said current and generally constant watt in the adjacent relatively higher value current region, said network being connected to said deriving means and responsive to dissipation in excess of said critical value to render said takeover means active to modulate said control circuit current in the turnoff sense to reduce said dissipation only to said critical value while permitting continuous conduction in said conducting path, said non-linear network comprising a first linear resistor, included in a connection across the series combination of said transistor and voltage dropping device, a first diode having a non-linear resistance-characteristic included in blocking polarity in a connection across said voltage dropping device, and a second non-linear resistance diode included in a connection in conducting polarity across said voltage dropping device.

4. A regulated power supply having an input for receiving an unregulated voltage and having an output, electrical connections from said input to said output, a regulating transistor having base, collector and emitter electrodes, a controlled conducting path comprising two of said electrodes included in series in said connections and a control circuit including the third of said electrodes, a voltage dropping device connected in series in said conducting path, and means for limiting power dissipation in said transistor to a critical value comprising means for deriving from the current in said conducting path and from the voltage across said two electrodes electrical quantities representative of said current and said voltage, takeover means for modulating the current in said control circuit and a non-linear mixing network having a response characteristic that is generally linear in the low value region of said current and generally constant watt in the adjacent relatively higher value current region, said network being connected to said voltage deriving means and responsive to dissipation in excess of said critical value to render said takeover means active to modulate said control circuit current in the turnoff sense to reduce said dissipation only to said critical value while permitting continuous conduction in said conducting path, said non-linear network comprising a linear resistor included in a first connection across the series combination of said transistor and said voltage dropping device, a second connection including a second linear resistor across said voltage dropping device, a third connection including a third linear resistor across said two electrodes of said transistor and having a portion of its conducting path in common with said second connection and a diode having a non-linear resistance characteristic included in said common portion in blocking relationship with respect to the voltage of said voltage dropping device.

References Cited by the Examiner

UNITED STATES PATENTS

| | | | |
|---|---|---|---|
| 2,915,693 | 12/59 | Harrison | 323—22 |
| 3,007,102 | 10/61 | Kennedy | 321—16 |
| 3,072,841 | 1/63 | Saunders | 323—22 |
| 3,100,863 | 8/63 | McCullough | 323—22 |
| 3,105,188 | 9/63 | Harrison | 323—22 |

LLOYD McCOLLUM, *Primary Examiner.*

MILTON O. HIRSHFIELD, RALPH D. BLAKESLEE,
*Examiners.*